Patented Feb. 5, 1946

2,394,266

UNITED STATES PATENT OFFICE 2,394,266

ISOPRENE RESINS AND METHOD OF MAKING THE SAME

Frank J. Soday, Swarthmore, Pa., assignor to The United Gas Improvement Company, a corporation of Pennsylvania No Drawing. Application August 10, 1940, Serial No. 352,119

8 Claims. (Cl. 260—93)

This invention relates to the preparation of synthetic hydrocarbon resins.

More particularly, this invention relates to the preparation of resinous isoprene polymers.

A principal object of the present invention is the preparation of hydrocarbon resins from cracked distillates of petroleum origin.

A further object of the present invention is the preparation of a hydrocarbon resin from cracked distillates in the isoprene boiling range, for example, in the boiling range of approximately 30–40° C.

Another object of this invention is the preparation of a hydrocarbon resin from a mixture of cracked distillates, in the isoprene boiling range, and aromatic hydrocarbons.

Other objects, including the provision of a simple and economical method of producing resins of this type, will be apparent from a consideration of the specification and claims.

The polymerization of isoprene has been extensively studied by a large number of investigators over a period of several years. Practically all of this work has been directed toward the preparation of synthetic rubber by the polymerization of isoprene with certain rubber-forming catalysts. For example, it has been found that the use of metallic sodium for this purpose results in the production of a very good grade of synthetic rubber.

In addition, the polymerization of isoprene in the emulsion state by the application of heat, or by the use of certain oxygen-containing catalysts such as hydrogen peroxide, also leads to the production of synthetic rubber.

On the other hand, the polymerization of isoprene, either alone or in combination with certain selected olefines and/or aromatic hydrocarbons, using halide-containing catalysts results in the production of resinous polymers. For example U. S. Patents Nos. 1,836,629; 1,947,626; 1,982,707; 2,023,495; 2,035,233; 2,039,363; 2,039,365; 2,039,367; 2,062,845; and 2,092,295 relate to such resinous materials.

These resinous products differ from synthetic rubber in that they possess a definite and reproducible softening point, and are compatible with drying oils. In addition, they do not lend themselves to vulcanization by any of the methods usually employed for this purpose in the rubber industry.

An important commercial source of isoprene at the present time is the light oil obtained by the pyrolysis of petroleum, or of certain petroleum hydrocarbons. In particular, the light oil obtained as a by-product in the manufacture of oil gas or carburetted water gas, in which pyrolysis is well known to take place in the vapor phase, is an especially desirable and abundant source of this material. The isoprene is commonly isolated from such light oil by fractional distillation, the material having a boiling range of approximately 30–40° C. being designated as the isoprene fraction. Exhaustive tests have shown that isoprene is the main unsaturated hydrocarbon present in this fraction, particularly when fairly high cracking temperatures have been employed in the preparation of the light oil from which such fractions have been isolated.

The isoprene fractions obtained in this manner may contain quantities of other diolefins, such as butadiene, cyclopentadiene, and/or piperylene. However, the total quantity of such diolefines present in a given isoprene fraction is usually and preferably less than the quantity of isoprene present.

For example a typical fraction may contain 42.3% isoprene, 27.1% olefines, 21.2% cyclopentadiene, 5.9% paraffines and 3.5% piperylene.

The cyclopentadiene is preferably removed prior to polymerization such as by the method described and claimed in Patent 2,211,038 dated August 13, 1940, to Alger L. Ward.

This typical fraction then would contain 53.7% isoprene, 34.4% olefines, 7.5% paraffines and 4.4% piperylene.

However I find that in the case of light oil isoprene fractions prior art methods for polymerization of isoprene, or mixtures of isoprene, olefines, and/or aromatic hydrocarbons, invariably lead to the production of liquid polymers as distinguished from the desired soluble solid polymers, or to the production of mixtures of liquid polymers and insoluble polymers.

The catalysts used in such prior art processes include boron trifluoride-organic solvent complexes, tin tetrachloride, aluminum chloride, aluminum chloride-organic solvent complexes, maleic anhydride, zinc chloride, titanium tetrachloride, phosphorus pentachloride, antimony trichloride, antimony trifluoride, sulfuryl chloride, sulfur dioxide, ferric chloride, and mixtures of certain of these catalysts.

As a result of extensive experimentation I have discovered that highly satisfactory solid resinous polymers may be produced upon polymerization of such fractions using boron trifluoride as catalyst as distinguished from all other catalysts of this type and complexes thereof and including complexes of boron trifluoride itself, provided the polymerizing temperature throughout the reaction is held below —20° C. and preferably below —30° C.

The resins obtained by my process are light in color, solid at room temperature, possess definite and reproducible softening points, and are compatible with drying oils. In addition, they are inert in character, are extremely resistant to attack by moisture, and possess excellent dielectric properties.

By the use of my process the formation of liquid polymer and insoluble polymer may be completely eliminated, or at least very substantially reduced, my experiments showing that when the temperature is as low as at least —30° C. substantially all soluble solid polymer is produced.

The isoprene resins obtained by this process are completely compatible with the usual drying oils, such as tung oil and linseed oil, and can be used for the preparation of varnishes, paints, lacquers, and other coating compositions. The coating films obtained by the application of the foregoing coatings compositions to surfaces, such as wood, metal, fiber, or fabric surfaces, or others are unusually resistant to attack by moisture and by a wide variety of corrosive liquids, such as dilute alkaline or acid solutions.

These resins also are ideally suited for the preparation of isoprene resin emulsions, as more fully described in my copending application Serial No. 352,120, filed August 10, 1940.

The light oil obtained in the manufacture of oil gas or of carburetted water gas is a very desirable source of the isoprene fractions used in my invention, and the products obtained are of unusually high quality.

Light oil isoprene fractions invariably contain olefines, such as the isomeric amylenes, which also enter into the reaction to a degree dependent upon the drasticity of the polymerizing conditions employed. Under the usual operating conditions, a considerable portion of the olefines present are incorporated in the resinous polymers obtained. As the ratio of isoprene to the other unsaturated or reactive hydrocarbons present in the reaction mixture has a considerable influence upon the quality and yield of the resulting polymer, as will be more fully explained hereinafter, it is preferred that the composition of the isoprene fraction employed be controlled within limits to be hereinafter set forth.

Fractions containing almost any desired proportion and concentration of isoprene and other unsaturated hydrocarbons may be obtained by fractionation of the light oil. In addition, various other methods may be used for obtaining the selected ratio and/or concentration of isoprene and olefines in such fractions. For example, if the proportion of isoprene in any given fraction is too high to permit the production of a resin having the desired characteristics, a portion of the isoprene may be removed prior to polymerization such as by treating the solution with a suitable quantity of cuprous chloride, followed by filtration to remove the isoprene-cuprous chloride complex formed. An alternative method of increasing or decreasing the relative proportions of any of the components at will comprises blending a given fraction with a fraction rich in the desired component or components, or with the desired component in a pure or relatively pure form. For example, the substantially pure isoprene obtained by decomposing the isoprene-cuprous chloride complex previously referred to, such as by the application of heat, may be added to a second fraction deficient in isoprene.

The isoprene preferably comprises 90% or more of the total diolefines present, although highly satisfactory resins have been obtained when using a mixture of diolefines in which the isoprene content was 75%, or less, based on the total diolefine content, said mixture also containing olefines.

Although light oil fractions containing any desired concentration of isoprene may be used, I have found that fractions containing from 40% to 95% isoprene give especially good results. The exact concentration and ratio of the isoprene and olefines present in any particular fraction depends, among other things, upon the cracking conditions under which the light oil was produced, as well as upon the extent to which the light oil has been fractionated. In the same way, fractions possessing a higher isoprene concentration and a higher ratio of isoprene to olefines may be obtained by efficiently fractionating a given sample of light oil, such as by the use of a fractionating column possessing a large number of theoretical plates in conjunction with the use of a relatively large reflux ratio, than can be obtained by the use of less drastic refining methods.

It is apparent that light oil fractions containing the desired concentrations of unsaturated hydrocarbons, as well as any desired ratio of diolefines to olefines, can be obtained by the use of the foregoing methods, either alone or in combination.

The most important variables in the conversion of light oil isoprene fractions to soluble solid resinous polymers by my invention are (1) concentration of unsaturated hydrocarbons, (2) proportion of catalyst used, (3) temperature, and (4) ratio of isoprene to olefines or other reactive compounds.

With respect to the concentration of unsaturated hydrocarbons present in the reaction mixture, it has been found that the addition of limited quantities of an aliphatic or aromatic solvent to the isoprene fraction is desirable, particularly when the original isoprene fraction contained an unusually high proportion of unsaturated hydrocarbons (olefines and diolefines). This provides a dispersion medium for the catalyst during the polymerizing reaction, and prevents the reaction mixture from solidifying during the later stages of the reaction. In addition, the diluted resin solutions so obtained can be more readily hydrolyzed during the subsequent treatment to remove the catalyst.

In this connection, it is well to point out that the use of certain solvents to reduce the concenration of unsaturated hydrocarbons present in the reaction mixture may affect the nature or yield of the resinous polymers subsequently obtained. For example, the use of toluene or higher boiling aromatic hydrocarbons for this purpose may result in the production of resinous polymers having chemically combined a substantial quantity of toluene or other aromatic hydrocarbon residues. In general, the resins obtained in this manner possess very desirable characteristics.

The quantity of catalyst used and the manner in which it is added to the reaction mixture has a considerable influence upon the nature and yield of the polymer obtained. There appears to be a certain minimum concentration of catalyst below which polymerization does not take place. While this quantity varies somewhat with the specific light oil fraction used, it may be stated that very little, if any, polymerization occurs when less than 0.2% of boron trifluoride, based on the total unsaturated hydrocarbons present, is used.

The catalyst is preferably added in small increments in order to maintain the temperature of the reaction mixture at a reasonably constant level. The addition of large quantities of catalyst during very short periods of time usually results in sudden temperature surges which may raise the temperature of the reaction mixture to undesirable levels.

The catalyst may be added to the reaction mixture in any desired manner. A suitable procedure is to slowly bubble the gaseous boron trifluoride, or a mixture of gaseous boron trifluoride with an inert or other gas, through the reaction mixture at the desired temperature, care being exercised to avoid feeding the catalyst at too high a rate.

My process may be carried out at any desired pressure above, below or at atmospheric pressure. However atmospheric or slightly above atmospheric pressure is usually preferred in order to retard or prevent loss of catalyst.

The reaction is conveniently carried out in a vessel equipped with an agitator in order to insure a uniform distribution of reactants during the polymerizing process, as well as to enable the temperature of the reaction mixture to be controlled within the desired limits. In this event, the catalyst may be introduced below, or immediately underneath, the agitator blade if desired, in order to permit a rapid and uniform distribution of the catalyst.

An alternative procedure comprises the addition of the gaseous boron trifluoride, either as such or in admixture with an inert or other gas such as nitrogen, into the free space above the liquid in the reaction vessel. The catalyst then is absorbed into the body of the reaction mixture. This procedure also may be carried out under increased pressure, if desired, in order to prevent any undue loss of catalyst.

Another procedure for introducing the catalyst comprises dissolving the catalyst in a liquid, which may then be added to the reaction mixture at any desired rate.

The molecular weight, and hence the softening point, of the resinous material may be varied over a considerable range by controlling the polymerizing temperature. Generally speaking, the use of temperatures considerably below −20° C. results in the production of resinous polymers having relatively high softening points and, conversely, the use of polymerizing temperatures approaching −20° C. results in resinous polymers having relatively low softening points.

The ratio of isoprene to olefines and/or other reactive compounds present in the starting material has a considerable influence upon the physical properties of the product obtained. Thus, in general, an increase in the ratio of the olefines and/or the other reactive materials to isoprene results in a corresponding reduction in the softening point of the resinous polymers subsequently obtained. Conversely, an increase in the ratio of isoprene to other unsaturated hydrocarbons results in the production of resinous polymers having relatively higher softening points.

In general, the following may be said to be reasonably preferred limits for the reaction variables previously discussed: (1) total concentration of unsaturated hydrocarbons: 10% to 80% by weight, (2) quantity of boron trifluoride catalyst: 0.2% to 5.0% by weight of the total unsaturated and reactive compounds present, (3) temperature: −60° C. to −20° C., and (4) proportion of isoprene present in terms of the total unsaturated aliphatic compounds (olefines and diolefines): from 40% to 95% by weight.

When a light oil fraction, boiling between 30° C. and 40° C., is employed, in which isoprene has been so concentrated by fractional distillation as to constitute 95%, by weight, of the total unsaturated aliphatic compounds (olefines and diolefines) in the fraction, the presence in the fraction of olefines and diolefines other than amylenes and isoprene is precluded and, therefore, the remaining 5% of the content of unsaturated aliphatic compounds in the fraction is in the form of amylenes. Of course, when the proportion of isoprene in the total unsaturated aliphatic content of such a fraction is lower, the proportion of amylenes therein is higher, so that light oil isoprene fractions boiling between 30° C. and 40° C., in which isoprene has been concentrated by fractional distillation so as to constitute between 40% and 95% by weight of the total unsaturated aliphatic compounds (olefines and diolefines) present in the fraction, contain at least 5%, by weight, of their content of unsaturated aliphatic compounds in the form of amylenes.

After polymerization, the reaction mixture preferably is treated in some manner to remove the unchanged catalyst present. This can be accomplished by a number of different procedures. For example, the reaction mixture may be heated to an elevated temperature, either with or without the application of vacuum, until substantially all of the gaseous boron trifluoride has been removed. During this procedure, steam or an inert gas, such as carbon dioxide, may be passed through the reaction mixture to assist in the removal of the catalyst, if desired. In case steam is used for this purpose, residual catalyst is hydrolyzed and the resulting mass may be filtered subsequently in order to remove all solid extraneous material.

A preferred procedure for neutralizing the reaction mixture comprises the addition of a neutralizing agent, such as a basic inorganic or organic material, either alone or in the form of a solution or suspension in a suitable liquid, such as alcohol. Examples of suitable basic neutralizing agents are sodium hydroxide, calcium hydroxide, ammonia, organic amines, and alcoholamines. After the neutralizing reaction has been completed, the solution then may be filtered to remove all solid extraneous material.

These two procedures may be combined, if desired, in order to reduce the quantity of neutralizing agent required. For example this may comprise heating the reaction mixture to room temperature, or above, in order to remove the major portion of the gaseous boron trifluoride present, followed by the addition of the desired neutralizing agent, such as an aqueous or an aqueous-alcoholic solution or suspension of an alkali, to hydrolyze the remainder of the catalyst. This usually is followed by filtration to remove solid products.

The filtration step may be carried out in several ways, such as by filtration through cloth or paper in a conventional type filter press. Various filter aids, such as clay or diatomaceous earth, may be added to the neutralized solution prior to filtration in order to assist in the removal of finely divided impurities. A basket type centrifuge or a supercentrifuge of any convenient type, also may be used in place of a filter press, if desired.

After neutralization and, if necessary, filtration, and/or other purifying steps the resinous solution is ready for use for many purposes, such as the preparation of spirit varnishes or enamels or the impregnation or coating of paper, fiber, or fabric articles. Alternatively, the solvent present may be removed in any suitable manner, which results in the isolation of a solid resin.

A desirable procedure for removing the unpolymerized material from the final resinous solution comprises distillation, such as at atmospheric or reduced pressures. Passing a stream of steam or an inert gas through the resinous solution during this procedure, particularly in its later stages, will materially assist in the removal of the last traces of any unpolymerized material present. Further treatment, particularly with superheated steam at reduced pressures, will assist in the removal of any low-molecular weight polymers present, thus increasing the melting point of the resin subsequently obtained.

Another procedure for isolating the resinous polymer comprises the addition to the resinous solution of a liquid in which the resin is substantially insoluble, but in which the unpolymerized material is soluble. Suitable liquids for this purpose include the low-molecular weight aliphatic alcohols, such as methyl alcohol or ethyl alcohol. The precipitated resinous material may be further treated to remove traces of residual solvent, if desired, by working on hot rolls, or by other suitable means.

Still another procedure for isolating the isoprene resin comprises dispersing the reaction mixture in the form of a very fine spray under conditions in which the unpolymerized material present is volatilized. In this procedure, the resin solution which has been preferably suitably preheated such as by heating under pressure, is sprayed into a tower or other vessel, where it is subjected to elevated temperatures and/or passed countercurrent to a stream of hot air, gas, or steam. The tower or vessel may be operated under reduced pressure, if desired, and the drying process may be further facilitated by the introduction into the tower, or vessel either as such or in admixture with the resin solution, steam, heated gases, or suitable low boiling liquids. The function of these added materials is to impart sensible heat to the system in order to assist in removing the last traces of unpolymerized material from the resinous product during the drying processs.

An alternative procedure comprises the addition to the reaction mixture prior to its introduction into the spray drying system of controlled quantities of a liquid in which the resin is insoluble, but in which the unpolymerized material present in the resinous solution is soluble. This is preferably accompanied by fairly rapid agitation in order to form a colloidal, or semi-colloidal, suspension of the resinous material prior to introduction into the spray drying system. By a suitable control of the several variables involved, the isoprene resin may be isolated in the form of particles of almost any desired size.

Other methods of isolating the resin will suggest themselves to those familiar with the art, such as passing the resinous solution over suitable hot rolls, and the like.

Any or all of the foregoing procedures may be carried out in continuous, semi-continuous, batch, countercurrent, batch countercurrent or other manner, as desired. For example, concurrent streams of an isoprene fraction, solvent, and catalyst, respectively, may be continuously charged to a suitable unit, such as a pipe coil, a combined pipe coil and reaction vessel, or a reaction vessel of suitable design, from which the polymerized fraction may be withdrawn continuously, semi-continuously, or bathwise as desired. This unit, of course, must be maintained at the desired polymerizing temperature, that is, at a temperature below $-20°$ C. It is apparent that the reactants may be kept in contact with each other for any desired period of time.

An alternative procedure comprises dissolving the gaseous boron trifluoride in some inert liquid, such as an inert solvent employed in the polymerizing process, and adding it to the isoprene fraction in this manner.

Likewise neutralization of the reaction mass may be carried out in a batchwise manner or it can be accomplished in a continuous or semi-continuous manner or otherwise. A suitable procedure comprises the continuous or semi-continuous addition of gaseous ammonia, or a mixture or solution of ammonia in alcohol or other suitable solvent, followed by raising the temperature of the reaction mixture to room temperature. In place of ammonia, an organic amine may be used, if desired.

Another procedure comprises the continuous or semi-continuous or other addition of alcohol, or a mixture or solution of other basic material, such as inorganic alkalies, followed by heating it to room temperature.

Alternative procedures comprise heating the reaction mass to room temperature, or above, with or without the application of vacuum, followed by the continuous or semi-continuous or other addition of any of the foregoing neutralizing agents, mixtures, or solutions.

The neutralized reaction mass may be filtered in a continuous or semi-continuous or other manner, as desired. For example this may be accomplished by the use of one of a battery of two filter presses, the second filter press being used whenever the operation of the first press is temporarily discontinued in order to permit the accumulated solid material to be removed.

Another procedure comprises the use of a continuous or semi-continuous or batch centrifuge, or series of centrifuges.

The clarified resinous solution may be distilled, or otherwise treated, in order to remove volatile unpolymerized material, if desired. This may be done for example in a continuous still, preferably operating under vacuum. Steam or an inert gas may be used during distillation to assist in the removal of the volatile material, if desired.

An alternative procedure comprises the continuous or semi-continuous or other addition of a coagulating agent, such as alcohol, to the clarified resinous solution, followed by separating the precipitated resin from the supernatant liquid, suitably by filtration or decantation. The precipitated resin may be treated subsequently to remove traces of residual solvent, such as by working on hot rolls or other means, as desired.

Another procedure comprises continuously or semi-continuously or otherwise processing the clarified resin solution in the spray drying system previously described.

The solid resin prepared by any of the foregoing procedures may be further processed or treated to improve its properties, if desired. For example, it may be treated with various decolorizing agents, such as clay, activated clay, carbon, activated carbon, bone char, graphite, fuller's earth, diatomaceous earth, and the like, at normal or elevated temperatures. The resin is preferably dissolved in a suitable solvent prior to any such treatment.

After treatment, the resin or resin solution is separated from any such treating agent, suitably by filtration. In case the resin has been dissolved in a solvent prior to treatment, the resinous solution may be treated to separate the resin from the solvent, if desired, by any of the procedures previously described for this purpose.

On the other hand, the clarified resin solution may be used as such for many purposes, such as the preparation of spirit varnishes or for impregnating or coating various materials, such as paper or textiles.

In place of the foregoing decolorizing procedures, other decolorizing methods may be used, if desired. A satisfactory method for this purpose comprises treating the resin, or preferably a solution of the resin in an inert solvent, with a strong mineral acid, followed by neutralizing and/or contacting the mixture with an adsorbent such as clay or fuller's earth. The clarified solution then may be treated to remove the solvent present by any of the methods previously discussed, if desired.

As these treating procedures are preferably applied to a solution of the resin, the process can be simplified by treating the original resin solution, suitably after it has been neutralized and clarified in the desired manner, prior to the hardening operation.

My new method for the preparation of solid resinous polymers from isoprene fractions may be further illustrated by means of the following examples.

*Example 1*

A 54.7 gram portion of a light oil isoprene fraction containing 85.6% by weight of isoprene, 8.2% by weight of amylenes, and 6.2% by weight of pentanes was placed in a one liter flask and immersed in a cooling bath. Approximately 164 grams of toluene was added to the same flask, after which the temperature of the mixture was reduced to —60° C. Small portions of gaseous boron trifluoride were passed into the reaction flask at five minute intervals until a total of three additions had been made. During this period, the temperature of the reaction mixture increased to —40° C. Additional quantities of gaseous boron trifluoride then were passed into the reaction mixture at 40 minute intervals during a period of 2 hours, the temperature being maintained at —60° C.

The mixture was maintained at this temperature for an additional period of 45 minutes, after which the temperature was permitted to rise to +10° C. in order to remove the major portion of the boron trifluoride present. The remainder of the catalyst was hydrolyzed by the addition of 15 cc. of ethyl alcohol, followed by the addition of 5 cc. of water after a period of ten minutes. At this point, 25 grams of calcium oxide were added to the mixture, after which the mixture was agitated for a period of one half hour and filtered. The unpolymerized material then was removed by distillation under reduced pressure.

Approximately 57.1 grams of a brittle, light yellow colored resin were obtained. The resinous product was completely soluble in the usual hydrocarbon solvents and had a melting point of 100° C. as determined by the standard ASTM ball and ring melting point method. It was completely compatible with the usual drying oils.

*Example 2*

An isoprene fraction containing 79.1% isoprene, 9.1% amylenes, and 11.8% pentanes, obtained by the fractionation of light oil from oil gas, was polymerized in a similar manner. A practically quantitative yield of a light amber colored, brittle resin was obtained.

The resin was completely soluble in the usual hydrocarbon solvents, and had a melting point of 96° C. as measured by the standard ASTM ball and ring method.

*Example 3*

An isoprene fraction, obtained by the fractionation of light oil from oil gas and containing 79.1% isoprene, 9.1% amylenes, and 11.8% pentanes, was polymerized at a temperature of —40° C. in a manner similar to that outlined in Example 1. A quantitative yield of resin, based on the total weight of isoprene and amylenes present in the charging stock, was obtained.

The resinous product was light yellow in color and had a melting point of 93° C. as measured by the ASTM ball and ring method.

*Example 4*

A sample of light oil isoprene, obtained by the fractionation of the condensate obtained in the manufacture of oil gas and containing 79.1% isoprene, 9.1% amylenes, and 11.8% pentanes, was polymerized at —30° C. according to the method outlined in Example 1. A practically quantitative yield of a light yellow colored, brittle resin was obtained.

The resin was completely soluble in the usual solvents, and had a softening point of 84.3° C. as measured by the ASTM ball and ring method.

As may be readily calculated from the data given above, in the light oil isoprene fraction employed in Example 1, isoprene constituted 91.3% by weight of the total unsaturated aliphatic compounds present with amylenes constituting all of the remaining 8.7%. In Examples 2 to 4, isoprene constituted 89.7% of the total unsaturated aliphatic compounds present, with amylenes constituting all of the remaining 10.3%.

While the features herein described comprise preferred embodiments of my invention, it is to be understood that the invention is not to be limited to these precise features, and that changes may be made therein without departing from the scope of the invention, which is defined in the appended claims.

I claim:
1. A process for the production of a resin solid at room temperature by the polymerization of an amylene-containing light oil isoprene fraction obtained from light oil produced in the vapor phase pyrolysis of petroleum oil and boiling between approximately 30° C. and 40° C. and containing isoprene as the preponderant diolefine present therein, said fraction being free from the preponderant part of the cyclopentadiene originally present, the proportion of amylenes present in said fraction being at least 5% by weight of and the proportion of isoprene present in said fraction being between 40% and 95% by weight of the total unsaturated aliphatic hydrocarbons contained in said fraction, comprising adding to said fraction under conditions such that the total concentration of unsaturated hydrocarbons present in the starting material is between 10% and 80% by weight from 0.2% to 5% by weight of boron trifluoride based on the unsaturated hydrocarbons present while maintaining the temperature of the reaction mass below −20° C.

2. A process for the production of a resin solid at room temperature by the polymerization of an amylene-containing light oil isoprene fraction obtained from light oil produced in the vapor phase pyrolysis of petroleum oil and boiling between approximately 30° C. and 40° C. and containing isoprene as the preponderant diolefine present therein, said fraction being free from any material proportion of the cyclopentadiene originally present, the proportion of amylenes present in said fraction being at least 5% by weight of and the proportion of isoprene present in said fraction being between 40% and 95% by weight of the total unsaturated aliphatic hydrocarbons contained in said fraction, comprising adding to said fraction under conditions such that the total concentration of unsaturated hydrocarbons present in the starting material is between 10% and 80% by weight from 0.2% to 5% by weight of boron trifluoride based on the unsaturated hydrocarbons present while maintaining the temperature of the reaction mass between −20° C. and −60° C.

3. A process for the production of a resin solid at room temperature by the polymerization of a mixture of an amylene-containing light oil isoprene fraction and aromatic hydrocarbon material, said fraction being obtained from light oil produced in the vapor phase pyrolysis of petroleum oil and boiling between approximately 30° C. and 40° C. and containing isoprene as the preponderant diolefine present therein, said fraction being free from the preponderant part of the cyclopentadiene originally present, the proportion of amylenes present in said fraction being at least 5% by weight of and the proportion of isoprene present in said fraction being between 40% and 95% by weight of the total unsaturated aliphatic hydrocarbons contained in said fraction, comprising adding to said mixture under conditions such that the total concentration of unsaturated hydrocarbons present in the starting material is between 10% and 80% by weight from 0.2% to 5% by weight of boron trifluoride based on the unsaturated hydrocarbons present while maintaining the temperature of the reaction mass below −20° C.

4. A process for the production of a resin solid at room temperature by the polymerization of a mixture of an amylene-containing light oil isoprene fraction and aromatic hydrocarbon material, said fraction being obtained from light oil produced in the vapor phase pyrolysis of petroleum oil and boiling between approximately 30° C. and 40° C. and containing isoprene as the preponderant diolefine present therein, said fraction being free from any material proportion of the cyclopentadiene originally present, the proportion of amylenes present in said fraction being at least 5% by weight of and the proportion of isoprene present in said fraction being between 40% and 95% by weight of the total unsaturated aliphatic hydrocarbons contained in said fraction, comprising adding to said mixture under conditions such that the total concentration of unsaturated hydrocarbons present in the starting material is between 10% and 80% by weight from 0.2% to 5% by weight of boron trifluoride based on the unsaturated hydrocarbons present while maintaining the temperature of the reaction mass between −20° C. and −60° C.

5. The product of the process of claim 1.
6. The product of the process of claim 2.
7. The product of the process of claim 3.
8. The product of the process of claim 4.

FRANK J. SODAY.